2 Sheets—Sheet 1.

W. T. MARTIN & J. M. STEWART.
Seeding-Machine.

No. 221,588. Patented Nov. 11, 1879.

WITNESSES:
Fred. G. Dieterich
J. R. Littell

INVENTOR:
William T. Martin
John M. Stewart
per C. A. Snow & Co.
Attys

N. PETERS, PHOTO-LITHOGRAPHER, WASHINGTON, D. C.

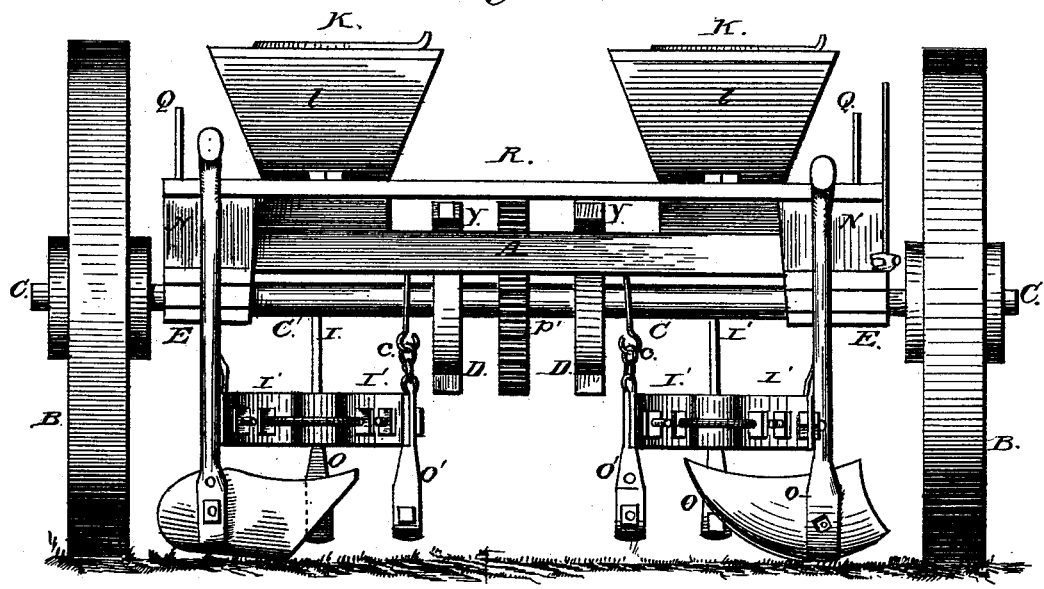

UNITED STATES PATENT OFFICE.

WILLIAM T. MARTIN AND JOHN M. STEWART, OF CLARKSVILLE, ARKANSAS.

IMPROVEMENT IN SEEDING-MACHINES.

Specification forming part of Letters Patent No. 221,588, dated November 11, 1879; application filed December 3, 1878.

*To all whom it may concern:*

Be it known that we, WILLIAM T. MARTIN and JOHN M. STEWART, of Clarksville, in the county of Johnson and State of Arkansas, have invented certain new and useful Improvements in Seeding-Machines; and we do hereby declare that the following is a full, clear, and exact description of the invention, which will enable others skilled in the art to which it appertains to make and use the same, reference being had to the accompanying drawings, which form a part of this specification.

Figure 1:
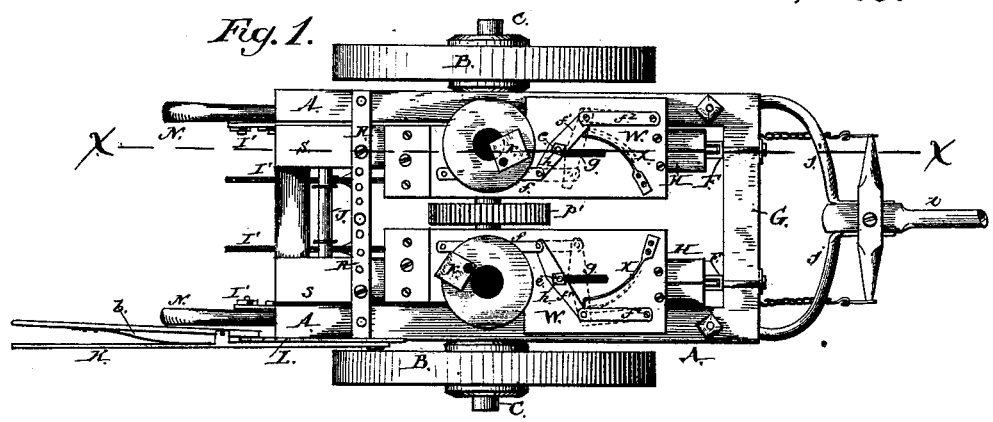
Figure 2:
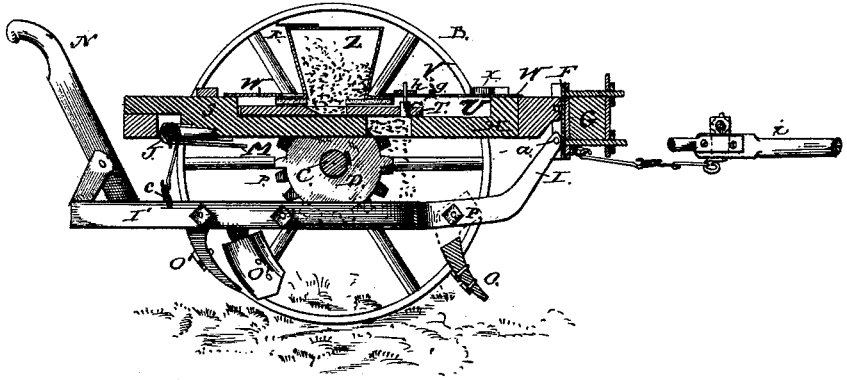
Figure 3:
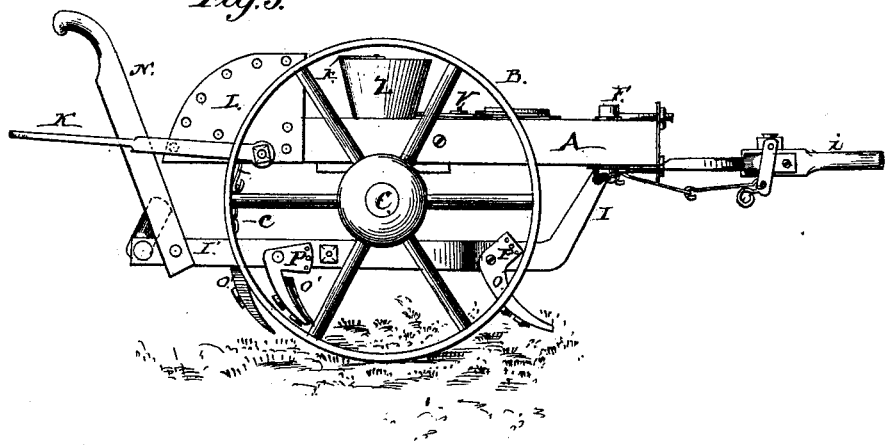

Figure 1 is a plan view of an agricultural implement embodying the main features of our invention. Fig. 2 is a longitudinal section taken through the line $x\,x$ in Fig. 1. Fig. 3 is a side elevation. Fig. 4 is a rear elevation.

This invention has relation to agricutural implements; and it consists in the improvements in the construction of the same hereinafter fully described, and particularly pointed out in the claims.

In the accompanying drawings similar letters of reference indicate corresponding parts in the several figures.

A is the frame of the machine, which is supported upon two carrying-wheels, B B, on a shaft, C, which is provided with two detachable cam-wheels, D D. Boxes E E depend from the frame A to form the bearings for the shaft or axle C. Recessed flanges or clasps F F are adjustably fastened to the front cross-piece G of the frame A, to which are pivoted the front ends of an auxiliary frame, H, and beneath its pivotal point are also pivoted the forward ends of the plow or cultivator beams I I by bolts and nuts.

Near the rear end of the frame A a double-cranked shaft, J, has bearings in the sides of said frame A near the lower edges of said sides, and it is provided at one end with a lever, K, provided with a spring-detent, $b$, which engages with a perforated rack, L. To this double-cranked bar J the rear portions of the plow or cultivator beams I I, which are bifurcated into beams I′ I′ I′ I′, are connected by chains $c\,c$, and the rear ends of the auxiliary frame H have hooks M M, which hook over the horizontal portion of said bar J, and retain the rear portion of the auxiliary frame H in place. By pulling the lever K forward the auxiliary frame H and the plows will be elevated and thrown out of operation.

The extreme rear ends of the plow or cultivator beams I I are provided with plow-handles N. Plows O O′ are pivoted to the plow-beams I I′, and have perforated arms P extending forward of their pivotal points, which are connected with the plow-beams I I′ by wooden pins, which, when the plows strike an unyielding obstruction, will break, and thus prevent the plows themselves from breaking.

Two standards, Q Q, rise from the side rails of the frame A near their rear ends, and upon these standards are slipped the ends of a perforated bar, R, which, in Fig. 1, connects the rear ends of the two sections S S of the auxiliary frame H, and allows of the adjustment of the same at this point for regulating the distance between the rows. The sections S S of the auxiliary frames H are recessed at $u$, (see Fig. 2,) in which a slide-valve, T, provided with a stud, V, works. The stud V penetrates a hole, $e$, in a jointed arm, $f\,f'\,f^2$, pivoted upon a slotted plate, W, secured to the face of each section S S. The stud V works in the slot $g$ in said plate W, and a nut, $h$, secures the jointed arm to said stud V.

A spring, X, secured to the plates W, bears against the sections $f'$ of the jointed arms, and holds them back to place after the studs V have slipped over the cams on the wheels D D. (See Fig. 4.) As the machine moves forward the cam-wheels D, or the wheels provided with the raised projections, forming knockers, come in contact with the downwardly-projecting studs V′, attached to the under side of the arms $f$, forming a part of the slide-valve mechanism, and cause the slide-valves carrying the desired quantity of seed to move forward, register with the discharge-opening, and deposit its grain. After the cam-wheels or knockers have ceased to operate, the slide-valves are thrown into their normal position by means of the retracting-spring X.

The tongue $i$ is secured to the frame A by hounds $j\,j$, and the whiffletree is also connected by chains and hooks to the frame A, as shown.

Hoppers Z Z are secured to the sections S S of the auxiliary frame H directly over the slide-valves T T, and these hoppers are provided with covers $k\,k$. The corn is placed in the hoppers, and the cams on the cam-wheels D D, when the machine is in motion, operate the slide-valves T T and drop the corn at regular intervals, so that it can be plowed both ways. The plows O open the furrows, and the plows O' follow and cover the corn after it has been dropped. To the same plow-shanks cotton-scrapers can be attached by removing the plows, and the implement is thus readily converted into a cotton-scraper. The slotted plates W, hoppers Z Z, and valve-slides T T are removable, as are also the auxiliary frames H or sections S S, constituting the frame H.

Having thus described our invention, what we claim as new and useful, and desire to secure by Letters Patent of the United States, is—

1. The adjustable recessed flanges F F, fastened to the front cross-bar, G, of the main frame A, and serving as means for attaching the front ends of the auxiliary frame H and the forward ends of the plow-beams I in the recess of the flange, substantially as set forth and shown.

2. The combination, with the pivoted auxiliary frame H, having plows suspended therefrom, of the mechanism for throwing the plows and seed-feeding devices in and out of operation, consisting of the double-cranked shaft J, lever K, and the hooks M M, whereby the rear end of the auxiliary frame is elevated simultaneously with the raising of the plows, substantially as described.

In testimony that we claim the foregoing as our own we have hereto affixed our signatures in presence of two witnesses.

WILLIAM T. MARTIN.
JOHN M. STEWART.

Witnesses:
  J. H. BURHAM,
  P. W. THOMPSON.